(12) United States Patent
Harden et al.

(10) Patent No.: US 9,233,422 B2
(45) Date of Patent: Jan. 12, 2016

(54) SUPERHARD CUTTER ELEMENT

(75) Inventors: Peter Michael Harden, Shannon (IE); Anthony Joseph Cooper, Frankfurt (DE)

(73) Assignee: ELEMENT SIX LIMITED (IE)

( * ) Notice: Subject to any disclaimer, the term of this patent is extended or adjusted under 35 U.S.C. 154(b) by 970 days.

(21) Appl. No.: 13/319,015

(22) PCT Filed: May 14, 2010

(86) PCT No.: PCT/EP2010/056673
§ 371 (c)(1),
(2), (4) Date: Mar. 27, 2012

(87) PCT Pub. No.: WO2010/130834
PCT Pub. Date: Nov. 18, 2010

(65) Prior Publication Data
US 2012/0183364 A1 Jul. 19, 2012

(30) Foreign Application Priority Data
May 15, 2009 (GB) .................................... 0908375.9

(51) Int. Cl.
*B23B 27/00* (2006.01)
*B23B 27/14* (2006.01)
*B22F 7/06* (2006.01)
(Continued)

(52) U.S. Cl.
CPC ................. *B23B 27/141* (2013.01); *B22F 7/06* (2013.01); *B23D 61/04* (2013.01); *C22C 26/00* (2013.01); *B22F 2005/001* (2013.01); *B23B 2226/125* (2013.01); *B23B 2226/315* (2013.01); *C22C 2204/00* (2013.01); *Y10T 83/9319* (2015.04); *Y10T 407/24* (2015.01)

(58) Field of Classification Search
CPC .. B23B 27/14; B23B 27/148; B23B 2224/00; B23B 2200/08; B23B 2200/082; B23B 2200/28
USPC .......................................................... 407/119
See application file for complete search history.

(56) References Cited

U.S. PATENT DOCUMENTS

| 3,341,920 A | 9/1967 | Kelm |
| 3,745,623 A | 7/1973 | Wentorf, Jr. et al. |

(Continued)

FOREIGN PATENT DOCUMENTS

| CN | 1322272 A | 11/2001 |
| CN | 1131758 C | 12/2003 |

(Continued)

OTHER PUBLICATIONS

International Search Report for PCT/EP2010/056673 dated Oct. 18, 2010.

(Continued)

*Primary Examiner* — Will Fridie, Jr.
(74) *Attorney, Agent, or Firm* — Bryan Cave LLP

(57) ABSTRACT

A superhard cutter element for machining a workpiece comprising wood, metal, ceramic material or composite material, the superhard cutter comprising a superhard structure (140) having a rake side (110) and a flank side (120), the rake side (110) and the flank side (120) enclosing a wedge angle ω; and a protective layer (170) bonded to the superhard structure (140) at a rake interface (180) on the rake side (110), the protective layer (170) being softer than the material of the superhard structure (140).

17 Claims, 6 Drawing Sheets

(51) Int. Cl.
 B23D 61/04 (2006.01)
 C22C 26/00 (2006.01)
 B22F 5/00 (2006.01)

(56) References Cited

U.S. PATENT DOCUMENTS

| | | | |
|---|---|---|---|
| 4,382,477 A | 5/1983 | Barr | |
| 4,480,950 A | 11/1984 | Kraft et al. | |
| 4,766,040 A | 8/1988 | Hillert et al. | |
| 5,037,704 A | 8/1991 | Nakai et al. | |
| 5,348,108 A | 9/1994 | Scott et al. | |
| 5,639,285 A | 6/1997 | Yao et al. | |
| 5,697,994 A * | 12/1997 | Packer et al. | 51/309 |
| 5,820,311 A | 10/1998 | Grun et al. | |
| 5,830,813 A | 11/1998 | Yao et al. | |
| 5,833,021 A | 11/1998 | Mensa-Wilmot et al. | |
| 6,131,678 A | 10/2000 | Griffin | |
| 6,193,001 B1 | 2/2001 | Eyre et al. | |
| 6,439,327 B1 | 8/2002 | Griffin et al. | |
| 6,599,062 B1 | 7/2003 | Oles et al. | |
| 6,779,951 B1 | 8/2004 | Vale et al. | |
| 7,210,388 B2 * | 5/2007 | Pacher et al. | 83/835 |
| 7,234,550 B2 | 6/2007 | Azar et al. | |
| 7,426,969 B2 | 9/2008 | Azar | |
| 7,533,740 B2 | 5/2009 | Zhang et al. | |
| 8,505,654 B2 * | 8/2013 | Israelsson et al. | 175/425 |
| 2001/0054332 A1 | 12/2001 | Cheynet de Beaupre et al. | |
| 2003/0063955 A1 | 4/2003 | DeBeauprre et al. | |
| 2003/0161696 A1 | 8/2003 | Fritsch et al. | |
| 2005/0187093 A1 | 8/2005 | McHale et al. | |
| 2006/0120816 A1 | 6/2006 | Morimoto et al. | |
| 2006/0207802 A1 | 9/2006 | Zhang et al. | |
| 2008/0236900 A1 | 10/2008 | Cooley et al. | |
| 2008/0251293 A1 | 10/2008 | Mumma et al. | |
| 2009/0202314 A1 | 8/2009 | Okita et al. | |

FOREIGN PATENT DOCUMENTS

| | | |
|---|---|---|
| EP | 0520403 A | 12/1992 |
| EP | 1231004 A1 | 8/2002 |
| GB | 1557481 | 12/1979 |
| GB | 2150616 A | 7/1985 |
| GB | 2251879 A | 7/1992 |
| GB | 2335217 A | 9/1999 |
| GB | 2335618 A | 9/1999 |
| GB | 2335682 A | 9/1999 |
| JP | H04-261703 A | 9/1992 |
| JP | 07-024606 A | 1/1995 |
| JP | 11-505483 A | 5/1999 |
| JP | 2000-202705 A | 7/2000 |
| WO | 93-25795 A | 12/1993 |
| WO | 96-36465 A1 | 11/1996 |
| WO | 99-06667 A1 | 2/1999 |
| WO | 03-106085 A | 12/2003 |
| WO | 2004040095 A | 5/2004 |
| WO | 2006023845 A | 3/2006 |
| WO | 2007-020518 A1 | 2/2007 |
| WO | 2007-069025 A2 | 6/2007 |
| WO | 2008-015622 A2 | 2/2008 |
| WO | 2008-104946 A1 | 4/2008 |
| WO | 2008-104944 A1 | 9/2008 |
| WO | 2008-104945 A1 | 9/2008 |

OTHER PUBLICATIONS

International Search Report for PCT/IB2008/050716 dated Jul. 18, 2008.

* cited by examiner

SUPERHARD CUTTER ELEMENT

FIELD

This invention relates to superhard cutter elements, more particularly to tools for machining or cutting hard or abrasive bodies comprising a material such as metal, ceramic or wood, or composite materials.

BACKGROUND

Hard or abrasive workpiece materials, such as metal alloys, ceramics, cermets, certain composite materials and stone may need to be machined using tools having hard or superhard cutting tips. Cemented tungsten carbide is the most widely used tool material for machining hard workpiece materials, and is both hard and tough. Polycrystalline diamond (PCD) and polycrystalline cubic boron nitride (PCBN) are superhard materials, which may be used for machining certain metal alloys widely used in the automotive industry, for example. Superhard materials are extremely hard and may have Vickers hardness of at least about 25 GPa. However, superhard materials are typically less strong and tough than cemented carbide materials and consequently, they may be more prone to fracture and chipping than hard-metals. Superhard cutter inserts may comprise a superhard structure bonded to a support substrate, which is most typically formed of cemented tungsten carbide.

U.S. Pat. No. 3,745,623 discloses the manufacture of PCD in a titanium or zirconium protective sheath, some of which is converted to carbide during manufacture. A thin layer of this titanium or zirconium sheath may be left on the PCD over the chip breaker face.

U.S. Pat. No. 5,833,021 discloses a polycrystalline diamond cutter, particularly for use in drill bits for boring into the earth, having a refractory coating applied to the polycrystalline diamond surface to increase the operational life of the cutter.

U.S. Pat. No. 6,439,327 discloses a polycrystalline diamond cutter for a rotary drill bit for boring into the earth, in which a side surface of the cutter is provided with a metal layer high-pressure bonded to the side surface of the polycrystalline diamond. An example of a suitable metal is molybdenum.

U.S. Pat. No. 6,779,951 discloses a drill insert component made by sandwiching polycrystalline diamond (PCD) between a layer of cemented tungsten carbide, or similar hard material, and a multi-metal layer for improved interlayer bonding and a lower propensity for delamination.

PCT patent publication number WO/2008/104946 discloses a tool component comprising a layer of polycrystalline diamond having a working surface, and a softer layer having a thickness of up to 100 microns and containing a metal.

PCT patent publication number WO/2008/104944 discloses a method of machining a workpiece using a tool that includes a tool component comprising a layer of polycrystalline diamond having a working surface, and a softer layer containing a metal and bonded to the working surface.

United Kingdom patent publication number 2 251 879A discloses a method of making a preform cutting element for rotary drill bits for drilling or coring holes in subsurface formations. The method comprises the steps of forming an intermediate structure comprising superhard material bonded between two outer layers of less hard material. The superhard material preferably comprises polycrystalline diamond material, and the less hard material preferably comprises tungsten carbide.

There is a need to provide a superhard tool for cutting hard or abrasive workpieces to a tight tolerance finish, having a very smooth surface finish to a high level of dimensional accuracy, with reduced damage to the edges of the workpiece, and consequently enhanced tool life.

SUMMARY

A first aspect of the invention provides a superhard cutter element for machining a workpiece comprising wood, metal, ceramic material or composite material, the superhard cutter comprising a superhard structure having a rake side and a flank side, the rake side and the flank side enclosing a wedge angle between them, the wedge angle being an acute angle; a protective layer bonded to the superhard structure at a rake interface on the rake side, the protective layer being substantially softer than the material of the superhard structure; the wedge angle being at least about 20 degrees or at least about 35 degrees, and at most about 75 degrees, at most about 73 degrees or at most about 65 degrees.

In one embodiment of the invention, a region of the protective layer proximate the cutting edge has a thickness in microns of at least about $(13.3-0.11\omega)$ and at most the lower of about $(380-5.0\omega)$ and about $(126.6-0.11\omega)$, where the wedge angle $\omega$ is in the range from about 35 degrees to about 65 degrees. In one embodiment of the invention, a region of the protective layer proximate the cutting edge has a thickness in microns of at least about $(46.7-0.56\omega)$ and at most the lower of about $(380-5.0\omega)$ and about $(126.6-0.11\omega)$, where the wedge angle $\omega$ is in the range from about 35 degrees to about 65 degrees. In one embodiment of the invention, a region of the protective layer proximate the cutting edge has a thickness in microns of at least about 20 microns and at most about 200 microns, and the wedge angle $\omega$ is in the range from about 35 degrees to about 65 degrees.

In one embodiment of the invention, a region of the protective layer proximate the cutting edge has a thickness in microns of greater than about $(86.6-1.33\omega)$, where the wedge angle $\omega$ is in the range from about 35 degrees to about 65 degrees. In one embodiment of the invention, a region of the protective layer proximate the cutting edge has thickness in microns of less than about $(380-5.0\omega)$, where the wedge angle $\omega$ is in the range from 35 degrees to 65 degrees. In one embodiment of the invention, a region of the protective layer proximate the cutting edge has a thickness in microns of greater than about $(86.6-1.33\omega)$ and less than about $(462.5-6.5\omega)$, where the wedge angle $\omega$ is in the range from about 35 degrees to about 65 degrees.

In one embodiment of the invention, the protective layer comprises superhard material. In some embodiments, the protective layer comprises grains of a superhard material at a content level of at least about 20 volume % or at least about 30 volume % of the protective layer. In some embodiments, the protective layer comprises grains of a superhard material at a content level of at most about 80 volume % or at most about 60 volume % of the protective layer.

In one embodiment of the invention, the protective layer comprises a plurality of sub-layers. In one embodiment, the protective layer comprises a first sub-layer adjacent the rake interface, comprising inter-bonded diamond grains. In one embodiment the protective layer comprises a second sub-layer that is substantially free of superhard material. In one embodiment of the invention, the protective layer comprises a first sub-layer adjacent the rake interface and comprising inter-bonded diamond grains, and having a region proximate the cutting edge having a thickness of less than about 50 micron, less than about 30 micron or less than about 25 microns. In one embodiment, the protective layer comprises a layer or sub-layer that is substantially free of superhard material, the layer or sub-layer having thickness in the range from about 1 micron to about 80 microns.

In one embodiment of the invention, at least a portion of the protective layer is integrally formed with the superhard structure.

In some embodiments of the invention, the region of the protective layer proximate the cutting edge has a thickness of at least about 2 microns, at least about 5 microns, at least about 10 microns or at least about 15 microns. In some embodiments, a region of the protective layer proximate the cutting edge has a thickness of at most about 150 microns, at most about 100 microns, at most about 80 microns or at most about 40 microns. In some embodiment of the invention, a region of the protective layer proximate the cutting edge has a thickness in the range from about 15 microns to about 40 microns.

In some embodiments of the invention, the superhard structure comprises polycrystalline diamond (PCD) or polycrystalline cubic boron nitride (PCBN). In some embodiments, the superhard structure comprises PCD material in which the diamond content is at least about 80 volume % or at least 85 volume % of the material. In some embodiments, the PCD material comprises inter-bonded diamond grains having a mean size of at least about 0.5 microns, and in some embodiments the diamond grains have a mean size of at most about 55 microns, at most about 25 microns, at most about 15 microns or even at most about 10 microns. In one embodiment, the PCD material comprises diamond grains having a multi-modal size distribution, and in some embodiments, the diamond grains have a size distribution with a first peak in the range from about 1 micron to about 5 microns, and a second peak in the range from about 6 microns to about 12 microns.

In some embodiments of the invention, the mean Vickers hardness of the protective layer is at least about 10% less, at least about 20% less, or at least about 60% less than that of the superhard structure. In some embodiments, the protective layer comprises carbide of a metal selected from the group consisting of Mo, W, Nb, Ta, V, Ti, Cr, Zr, Hf and Si; or selected from the group consisting of Mo, Ta and Nb.

In one embodiment of the invention, the superhard structure comprises PCD material in the form of a layer, and in one embodiment the layer has a substantially uniform thickness, measured from the rake interface to the exposed surface of the cutter element on the rake side. In some embodiments, the thickness of the PCD structure is at least about 10 microns or at least about 100 microns, and in some embodiments the thickness of the PCD structure is at most about 400 microns or at most about 350 microns.

In one embodiment of the invention, the superhard structure is formed of PCD comprising at least 80 volume % diamond, the protective layer comprising a first sub-layer adjacent the rake interface and containing inter-bonded diamond grains, the content of the inter-bonded diamond grains being in the range from about 60 volume % to about 75 volume %, the first sub-layer having thickness proximate the cutting edge in the range from about 15 microns to about 30 micron; the protective layer comprising a second layer substantially free of superhard material; the thickness of the protective layer proximate the working edge being the sum of the thicknesses of the first and second sub-layers, and the thickness in microns being greater than about (86.6-1.33ω) and less than about (462.5-6.5ω), where the acute wedge angle ω is in the range from about 35 degrees to about 65 degrees.

A second aspect of the invention provides a segment, insert, blade or tool for machining or cutting a workpiece, comprising an embodiment of a superhard cutter element according to the invention. In one embodiment, the segment, insert, blade or tool is for machining or cutting a body comprising material for laminate flooring.

In one embodiment of the invention, the segment, insert, blade or tool is for performing an interrupted or rough cutting operation on a workpiece comprising metal. In one embodiment, an insert for performing an interrupted or rough cutting operation on a workpiece comprising metal, comprises an embodiment of a superhard cutter element according to the invention, in which a region of the protective layer proximate the cutting edge has a thickness in microns of at least about 20 microns and at most about 200 microns.

An aspect of the invention provides a method of using a segment, insert or tool comprising an embodiment of a superhard cutter element according to the invention, the method including engaging a workpiece comprising wood, composite or metal material, and removing material selectively from the workpiece.

Embodiments of the invention have the advantage of reduced fracture of the cutting edge of the superhard cutter element when used to machine or cut workpieces comprising hard or abrasive materials, particularly laminate flooring. This is achieved in combination with the advantage of achieving an enhanced quality, low tolerance finish on the workpiece.

DRAWING CAPTIONS

Non-limiting embodiments will now be described with reference to the drawings, of which FIG. 1 shows a schematic perspective view of part of a circular saw for cutting wood.

The same references refer to the same respective features in all drawings.

DETAILED DESCRIPTION OF EMBODIMENTS

As used herein, a "rake side" of a cutter element is the side comprising a rake face, which is the surface or surfaces of the cutting tool over which the chips flow in use. As used herein, "chips" are the pieces of workpiece removed from the work surface by a machine tool in use. As used herein, a "flank side" of a cutter element is the side comprising a "flank", which is the tool surface or surfaces over which the surface produced on the workpiece by a cutting tool passes. As used herein, a "cutting edge" is the edge of a rake face intended to perform cutting.

As used herein, a "superhard material" is a material having a Vickers hardness of at least about 25 GPa. Polycrystalline diamond (PCD) material and polycrystalline cubic boron nitride (PCBN) material are examples of superhard materials. As used herein, PCD material comprises a mass of diamond grains, a substantial portion of which are directly inter-bonded with each other and in which the content of diamond is at least about 80 volume % of the material. In one embodiment of PCD material, interstices among the diamond gains may be at least partly filled with a binder material comprising a catalyst for diamond. As used herein, PCBN material comprises a mass of cBN grains dispersed within a wear resistant matrix, which may comprise ceramic or metal material, or both, and in which the content of cBN is at least about 50 volume % of the material. In some embodiments of PCBN material, the content of cBN grains is at least about 60 volume %, at least about 70 volume % or at least about 80 volume %. Embodiments of superhard material may comprise grains of superhard materials dispersed within a hard matrix, wherein the hard matrix preferably comprises ceramic material as a major component, the ceramic material preferably being selected from silicon carbide, titanium nitride and titanium carbo-nitride. As used herein, a "polycrystalline superhard structure" means a structure comprising polycrystalline superhard material.

As used herein, a "machine tool" is a powered mechanical device, which may be used to manufacture components comprising materials such as metal, composite materials, wood or polymers by machining. As used herein, "machining" is the selective removal of material from a body, called a workpiece. Sawing and cutting are examples of machining operations.

Figure 1:
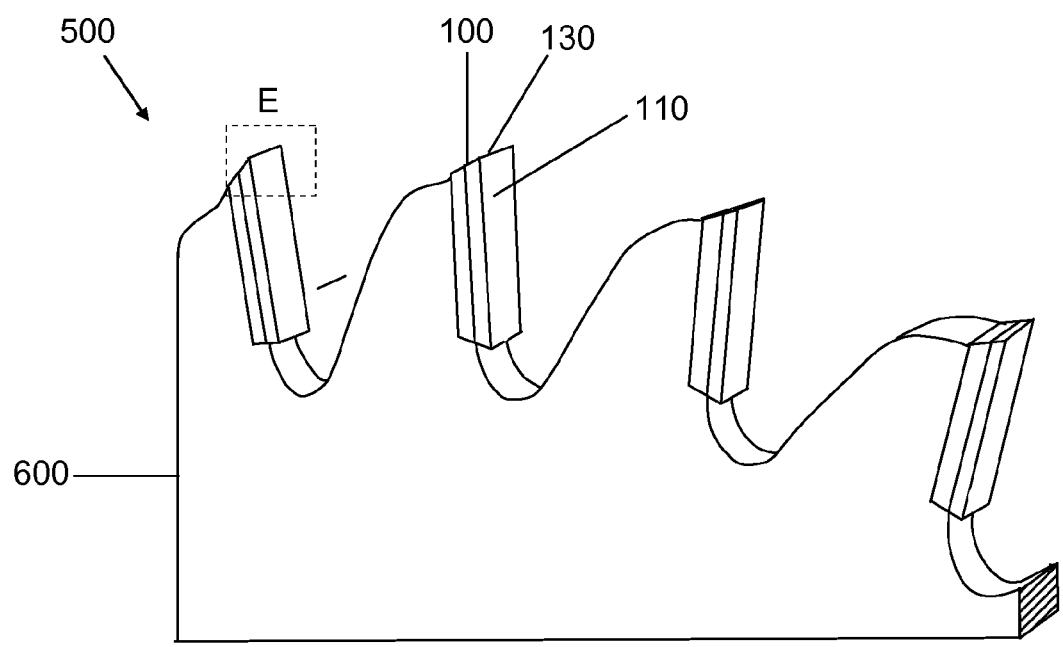

With reference to FIG. 1, an embodiment of a circular saw blade 500 for cutting wear resistant wood products, such as laminate flooring, comprises a plurality of PCD cutter elements 100 brazed onto the periphery of a blade base 600. The cutter elements 100 are arranged with the rake faces 110 of the PCD structures facing towards the forward direction of rotation of the saw in use, with cutter edges 130 disposed at radially outermost positions in order to be capable of cutting a workpiece (not shown) when the blade is rotated in use.

Figure 2:
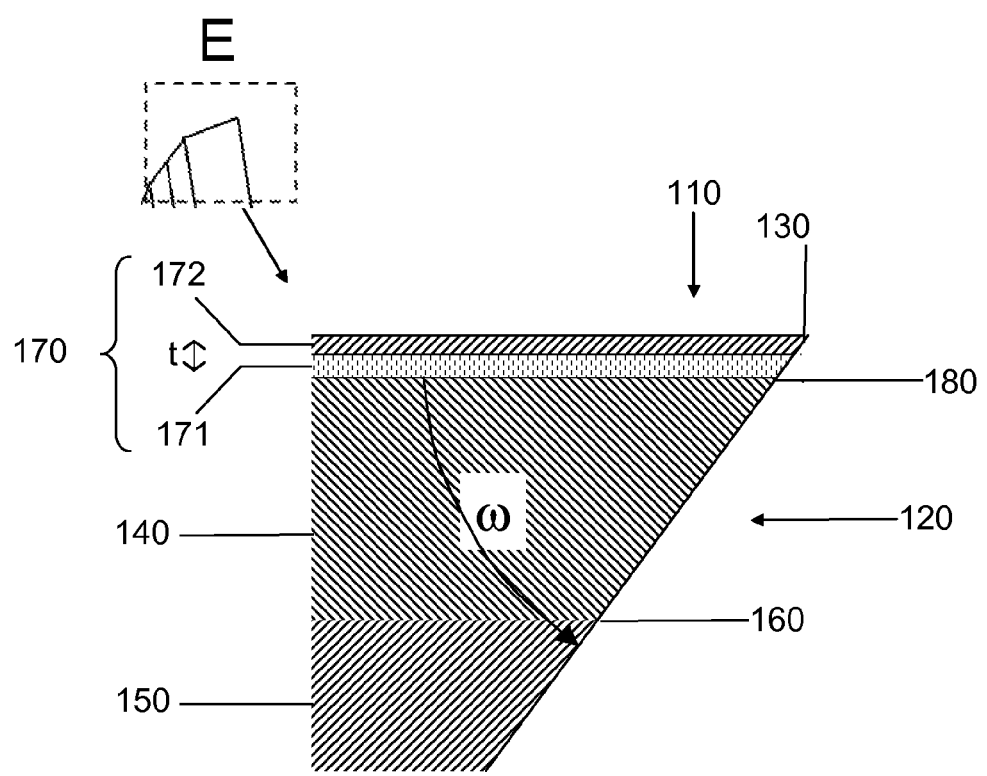
FIG. 2 shows an expanded schematic cross section view of part of a superhard cutter element indicated by "E" in FIG. 1.

With reference to FIG. 1 and FIG. 2, an embodiment of a PCD cutter element 100 for cutting wood has a rake side 110, a flank side 120, and a cutting edge 130 formed at the intersection of the rake side 110 and flank side 120. The cutter element 100 comprises a superhard structure 140 bonded to a support substrate 150 at a substrate interface 160. The superhard structure 140 is formed from PCD and the support substrate 150 is formed from cobalt-cemented tungsten carbide. A protective layer 170 is bonded to the PCD structure 140 at a rake interface 180. The protective layer 170 is softer than the PCD of the superhard structure 140 and comprises a first sub-layer 171 and a second sub-layer 172. The first sub-layer 171 comprises at least 50 volume % inter-bonded diamond, as well as cobalt and a minor amount of metal or metal compounds that have diffused from the second sub-layer 172.

The second sub-layer 172 consists essentially of metal carbide, with a minor amount of metal. The first sub-layer 171 has thickness in the range from about 20 microns to about 30 microns, and the second sub-layer 172 has thickness in the range from about 10 microns to about 25 microns. The combined thickness of the protective layer 170 is in the range from about 30 microns to about 55 microns. The acute wedge angle ω defined by the rake interface 180 and the flank side proximate the substrate interface 160 is in the range from 35 degrees to 65 degrees.

With reference to FIG. 2, an embodiment of a protective layer 170 integrally formed with a PCD structure 140 and comprising a first sub-layer 171 and a second sub-layer 172. The first sub-layer 171 comprises inter-bonded diamond as well as cobalt and a minor amount of metal or metal compounds that have diffused from the second sub-layer 172, the content of the diamond being in the range from about 70 volume % to about 80 volume %. The second sub-layer 172 consists essentially of metal carbide, with a minor amount of unreacted metal. The inter-bonded diamond of the first sub-layer 171 had been formed in the same sintering step as the PCD of the superhard structure 140 with which it is integrally bonded at an interface 180. The diamond content of the PCD structure 140 is about 90 volume %. The first sub-layer 171 has a thickness of about 25 microns and the second sub-layer 172 has a thickness of about 15 microns. The combined thickness of the protective layer 170 is about 40 microns and the average diamond content in the combined protective layer is about 47 volume %, which is about half that of the underlying PCD structure.

Figure 3:
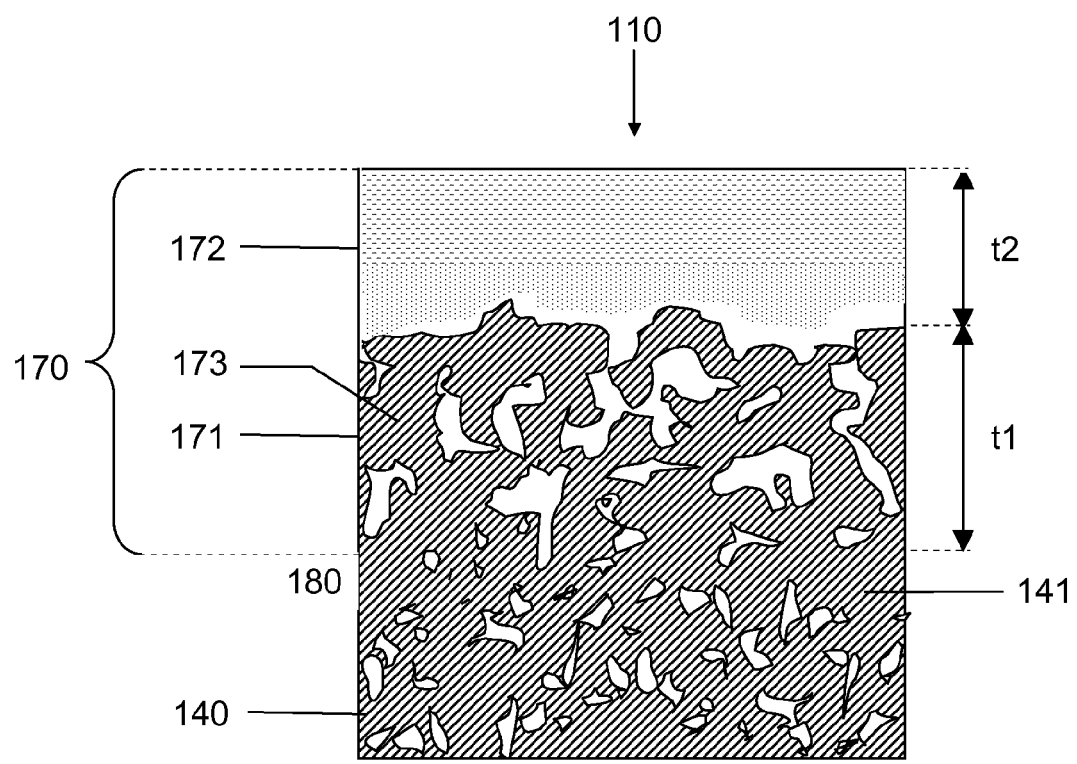
FIG. 3 shows a schematic cross sectional view of the microstructure of a portion of an embodiment of a superhard cutter element in the region of a rake side.

With reference to FIG. 3, an embodiment of a PCD cutter element comprises a protective layer 170 on the rake side of the PCD structure, the protective layer 170 comprising a first sub-layer 171 and a second sub-layer 172, the first sub-layer being adjacent a rake interface 180 with the rake face of the superhard structure 140. The first sub-layer comprises a mass of inter-bonded diamond grains 173 and the second sub-layer 172 is substantially free of superhard material such as diamond grains. The content of diamond grains 172 within the first sub-layer 171 is about 65 volume % of the sub-layer, and the content of diamond grains 141 within the superhard structure 140 is about 88 volume % of the superhard structure. The first sub-layer has a mean thickness t1 of about 30 microns and the second sub-layer has a mean thickness t2 of about 15 microns. In one embodiment of the invention, the protective layer comprises a layer or sub-layer that is substantially free of superhard material, the layer or sub-layer having thickness in the range from about 1 micron to about 80 microns.

Figure 4:
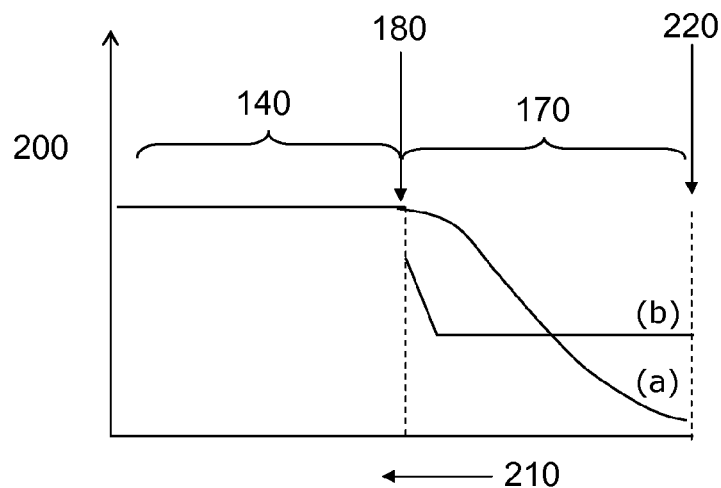
FIG. 4 shows two superimposed schematic graphs of the content of superhard material within a superhard cutter element versus depth from the surface.

With reference to FIG. 4, embodiments of a superhard cutter element comprises a protective layer 170 on the rake side of a PCD structure 140, the protective layer 170 comprising diamond grains, the content 200 of the diamond grains varying with depth 210 from the surface 220 of the protective layer 170 to the rake interface 180 with the PCD structure 140. In the embodiment indicated by (a), diamond is dispersed throughout the protective layer 170, its content 200 increasing strictly monotonically with depth 210 from the surface 220 towards the rake interface 180. In the embodiment indicated by (b), diamond is dispersed throughout the protective layer 170, its content 200 increasing from the surface 220 towards the rake interface 180, but being substantially constant throughout most of the protective layer 170.

Figure 5:
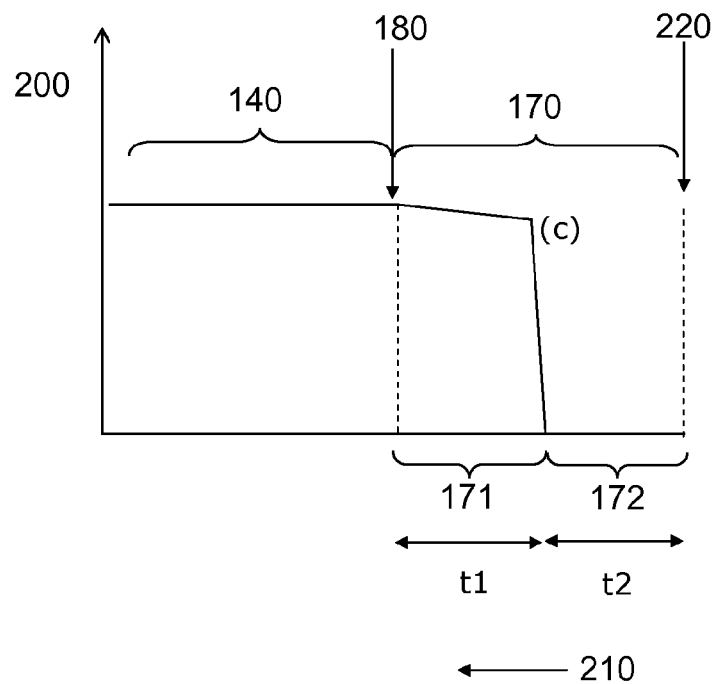
FIG. 5 shows a schematic graph of content of the superhard material within a superhard cutter element versus depth from the surface.

With reference to FIG. 5, an embodiment of a superhard cutter element comprises a protective layer 170 on the rake side of a PCD structure 140, the protective layer 170 comprising diamond grains, the content 200 of the diamond grains varying with depth 210 from the surface 220 of the protective layer 170 to the rake interface 180 with the PCD structure 140. The protective layer 170 comprises a first sub-layer 172 having thickness t1 and a second sub-layer 172 having thickness t2, the first sub-layer meeting the PCD structure 140 at rake interface 180, and comprising diamond. The second sub-layer 172 extends from the first sub-layer 171 to the surface 220 and is substantially devoid of diamond.

Figure 6:
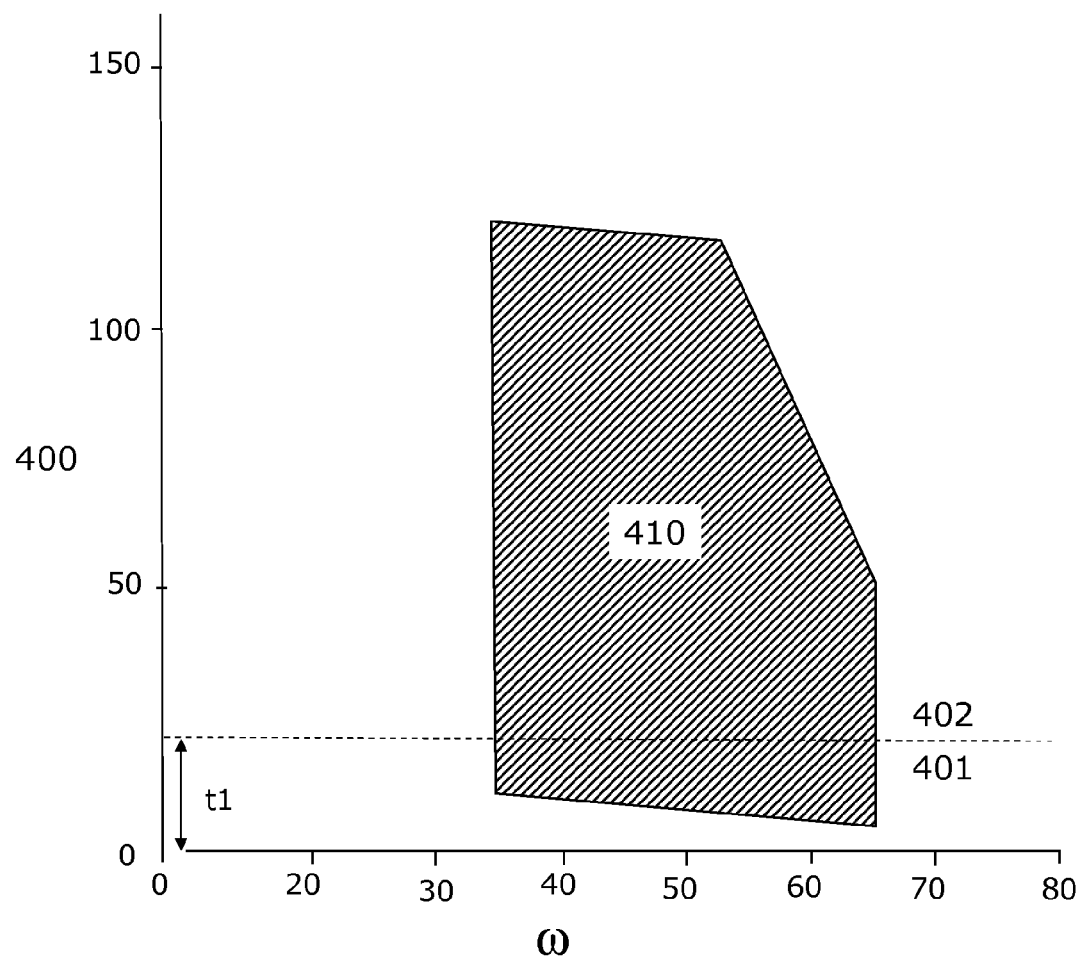
FIG. 6 shows a graph of thickness in microns of protective layers versus magnitude of wedge angle in degrees, and various regions including combinations of these dimensions.

With reference to FIG. 6, some embodiments of superhard cutters comprising PCD structures in layer form and protective coatings, the combinations of protective coating thicknesses 400 in microns and acute wedge angles ω in degrees being within the region of the graph indicated by 410. In some embodiments of the invention, the protective layer comprises a first sub-layer 401 having a mean thickness t1 and comprising diamond in the range from about 60 volume % to about 80 volume %, and a second sub-layer 402 substantially free of superhard material. The optimum combination of thicknesses and wedge angle may depend on several factors, including the grade of PCD used, the material used for the protective layer, the type workpiece material, the acceptable finish tolerance on the cut workpiece edge, and the desired cutting conditions, such as the feed rate and depth of cut, and whether the operation is roughing or finishing.

As used herein, "grain size" is expressed in terms of equivalent circle diameter (ECD). The ECD of a particle is the diameter of a circle having the same area as a cross section through the particle. The ECD size distribution and mean size of a plurality of particles may be measured for individual, unbonded particles or for particles bonded together within a body, by means of image analysis of a cross-section through or a surface of the body.

An example method for making a superhard compact according to the invention may include forming a plurality of superhard grains into an aggregated mass, disposing a metal or metal-containing material against a side of the aggregated mass; sintering the aggregated mass in the presence of a sintering aid to form the superhard compact; removing metal or metal-containing material from the compact to form a protective layer having a desired thickness; and forming a cutting edge onto the superhard structure. The method may include disposing a substrate against a first side of the aggregated mass and a metal or metal-containing material against an opposing second side of the aggregated mass; sintering the aggregated mass in the presence of a sintering aid to form the superhard compact; removing metal or metal-containing material from the compact to form a protective layer having a desired thickness; and forming a cutting edge onto the polycrystalline superhard structure. The method may include removing substantially all portions, layers or sub-layers of the protective layer proximate a cutting edge that are substantially free of superhard material. In some embodiments, the metal may be selected from the group consisting of Mo, W, Nb, Ta, V, Ti, Cr, Zr, Hf and Si, and more preferably the metal is selected from the group consisting of Mo, Ta and Nb. In one embodiment, the substrate may comprise cemented carbide (an example of a hard-metal), such as cobalt-cemented tungsten carbide. The aggregated mass may, for example only, be formed by blending diamond grains from a first source and having a first mean size and a second source and having a second mean size. In one embodiment, the first mean size may be in the range from 0.5 microns to about 4 microns and the second mean size may be in the range from about 8 microns to about 15 microns.

Figure 7A:
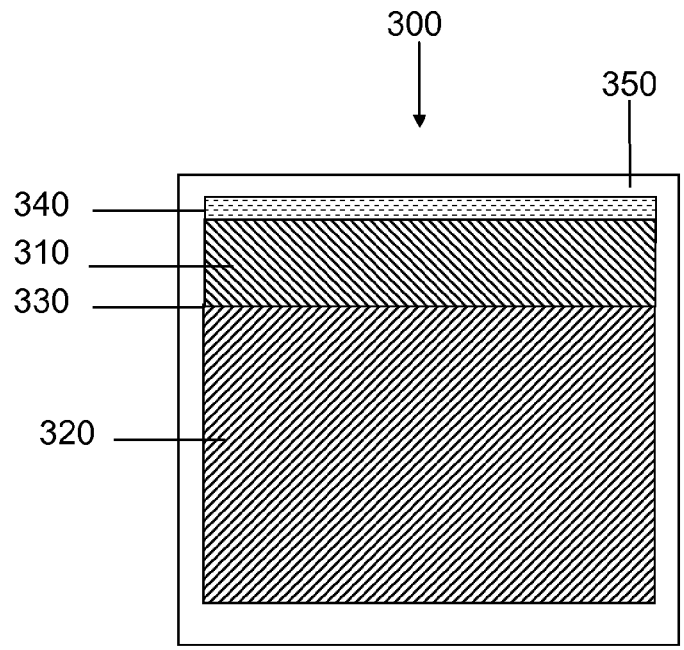
FIG. 7A and FIG. 7B show schematic cross-section views of embodiments of pre-form assemblies.
Figure 7B:
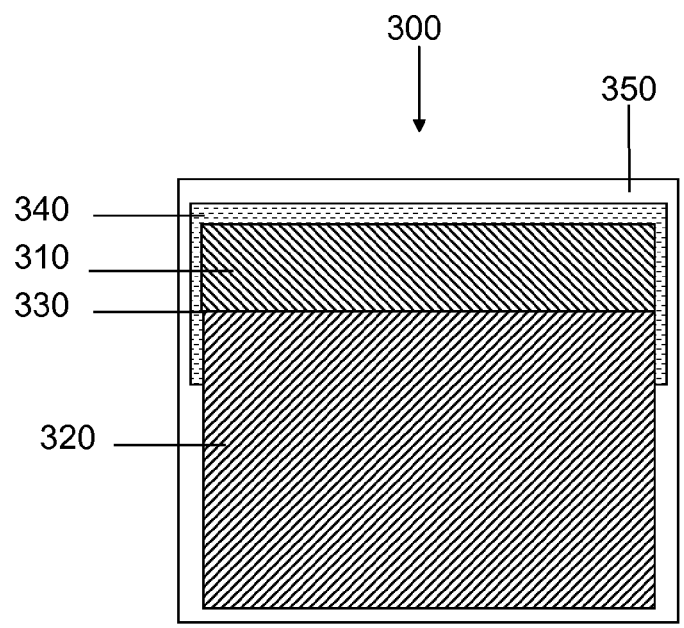

An example, non-limiting method for making embodiments of superhard compacts according to the invention is now described. A PCD compact may be made by forming a pre-compact assembly that includes a plurality of diamond grains formed into an aggregated mass, sintering aid for diamond and a substrate, and subjecting the pre-compact assembly to ultra-high pressure and temperature to sinter the diamond grains together, as is well known in the art. In one embodiment, the plurality of diamond grains has a mean size in the range from about 0.5 microns to about 15 microns. With reference to FIG. 7A and FIG. 7B, embodiments of the pre-compact assembly 300 may include the aggregated mass 310 of a plurality of diamond grains, a cobalt-cemented tungsten carbide support substrate 320, a disc or cup 340 comprising a carbide-forming refractory metal, and a jacket 350 that wholly or partially encapsulates these components. The aggregated mass 310 is placed against a surface of the substrate 320 at an interface 330 and the disc or cup 340 is placed against an opposing surface 350 of the aggregated mass 310. The pre-compact assembly 300 is then assembled into a capsule (not shown) for use in an ultra-high pressure and temperature furnace. The pre-compact assembly is then subjected to ultra-high pressure and temperature, for example a pressure of about 5.5 GPa and a temperature of about 1,350 degrees centigrade, and the diamond grains are sintered together to form PCD. In one embodiment, the sintering aid for diamond (also referred to solvent/catalyst for diamond) is molten cobalt sourced from the substrate 320 and infiltrates into the aggregated mass at an ultra-high pressure and temperature condition. Such ultra-high pressure and temperature may be, respectively, greater than about 5 GPa and 1,400 degrees centigrade. During the sintering step, some or all of the carbide-forming refractory metal within the disc or cup 340 reacts with carbon from the aggregated mass of diamond to form a ceramic carbide layer which together with some of the diamond from the aggregated mass forms the protective layer bonded to the sintered PCD structure. Excellent integral bonding of a carbide layer to a PCD structure may be achieved during the step in which the PCD is sintered at an ultra-high pressure and temperature.

After the sintering step, sintered PCD compact is processed to desired dimensions, leaving a protective softer layer on the rake side of the compact.

With reference to FIG. 7A and FIG. 7B, an embodiment of a superhard structure is formed of PCD and a first sub-layer of the protective coating is formed during the sintering step as a kind of "diluted" upper layer of PCD. This may result from the metal disc or cup 340 being placed against a surface 350 of the aggregated mass 310 of diamond grains. Such "diluted PCD" layer is removed in conventional practice because it is softer and less abrasion resistant then the underlying PCD structure. While wanting not to be bound by theory, it is believed that the "dilution" of PCD formation within this layer is associated with dissolution of diamond in the surrounding solvent/catalyst material, typically including cobalt, and reaction with the metal of the disc or cup to form metal carbide.

In one embodiment of a PCD cutter element, the PCD structure may comprise diamond grains having a mean grain size in the range from 0.5 to 11 micron, as disclosed in PCT publications numbers WO07/020518 and WO/2008/015622.

In one embodiment of a PCD cutter element, the PCD structure is ultra-thin as disclosed in PCT publication number WO07/069025, having thickness in the range from about 120 micron to about 180 micron.

In some embodiments, the superhard structure is formed of PCBN or silicon-carbide-bonded diamond.

Embodiments of the invention may be particularly suited to machining or cutting the following classes of metals: hardened steels (ISO application number H10 to H30), cast iron (ISO application number K10 to K30), powder metals and sintered irons (ISO application number P10 to P30) and super-alloys (ISO application number S10 to S30), as well as to roughing operations where the maximum undeformed chip thickness Hex is greater than 0.09 millimeters.

Embodiments of the invention may also be used in tools for boring into the earth or drilling into rock or stone, such as in drill bits used in the oil and gas industry.

Some embodiments of the invention may be particularly advantageous when the PCD structure comprises diamond grains with low mean size, and some embodiments of the invention may be particularly advantageous with thin PCD structures and in some embodiment, the thinner the PCD layer within these limits the better.

In embodiments where the rake interface is substantially parallel to the rake side, the rake side can be used to measure the wedge angle. In some embodiments, the superhard structure may be bonded or affixed to a support substrate at a substrate interface intersecting the flank side and the acute angle is defined by the rake interface and the flank side proximate the substrate interface. In some embodiments, the thinner the superhard structure, the thinner should be the layer or sub-layer.

In embodiments where there is a diamond-containing first sub-layer, this may be formed with the superhard structure, during the same sintering step.

As used herein, "roughing" or "rough cutting" is understood to be an aggressive form of machining in which workpiece material is removed at a relatively high rate by using a large depth of cut and feed rate. This is distinguished from "finishing", where the objective is to produce a high tolerance finish, and so the depth of cut and feed rates are lower. In roughing operations the load on the cutting edge of a tool is far greater than in finishing operations and so the cutting edge needs to be much stronger in a roughing operation, especially when the rake angle is positive.

Embodiments of the invention are suitable for roughing operations on workpieces comprising wood or composite materials. Embodiments of the invention are suitable for sawing, routing, turning, hogging or cutting an abrasive workpiece, such a wood-containing or composite-containing workpiece. Some embodiments of a tool comprising an embodiment of a superhard cutter element may be a saw, a router, a hogger or a cutter knife.

In some embodiments of the invention, the superhard structure comprises diamond, for example PCD, and the protective layer comprises a ceramic sub-layer comprising a ceramic material. In some embodiments, the ceramic material is selected from the group consisting of molybdenum carbide, tungsten carbide, niobium carbide, tantalum carbide, titanium carbide, vanadium carbide, chromium carbide, zirconium carbide, hafnium carbide and silicon carbide. In some embodiments, the ceramic material may be selected from the group consisting of molybdenum carbide, niobium carbide and tantalum carbide. In some embodiments, the protective layer may comprise metal, for example Mo, W, Nb, Ta, Ti, V, Cr, Zr or Hf, or an alloy containing at least two types of metal.

In some embodiments, the superhard structure comprises cBN, such as PCBN, and the protective layer comprises a ceramic layer or sub-layer that comprises a boride such as titanium diboride, nitride such as titanium nitride, boro-nitride, carbide or carbo-nitride such as titanium carbo-nitride.

In one embodiment, the protective layer proximate the cutting edge comprises grains of superhard material dispersed throughout the thickness of the protective layer, and there is no layer or sub-layer that is substantially devoid of superhard material. Such an embodiment may advantageously arise in use when an upper sub-layer that is substantially free of superhard material becomes worn away. Where this is found to occur, or where the cutter is processed thus prior to use, the wedge angle may advantageously be greater than 45 degrees.

Embodiments of the invention have the advantage that the impact resistance is substantially enhanced in cutting workpieces comprising wood. This advantage may be particularly evident in embodiments comprising PCD cutting structures when used for machining or sawing abrasive workpieces, especially workpieces comprising wood or composites, and where a relatively thick (i.e. of the order of tens of microns) protective layer of softer material is integrally bonded to a working surface proximate a rake side.

As used herein, a "multi-modal" size distribution of a mass of grains is understood to mean that the grains have a size distribution with more than one peak, each peak corresponding to a respective "mode". Multimodal polycrystalline bodies may be made by blending more than one source of a plurality of grains, each source comprising grains having a substantially different average size. Measurement of the size distribution of the blended grains typically reveals distinct peaks corresponding to distinct modes. When the grains are sintered together to form the polycrystalline body, their size distribution may be further altered as the grains are compacted against one another and fractured, resulting in the overall decrease in the sizes of the grains. Nevertheless, the multimodality of the grains is usually still clearly evident from image analysis of the sintered article.

The softer protective layer is less abrasion resistant than the underlying superhard structure and so does not protect it from abrasive wear. However, since softer materials are generally tougher than superhard materials, which are relatively brittle, the protective layer may reduce chipping or other fracture at the cutting edge by increasing the impact resistance. The softer protective layer provides the benefit of strengthening a cutting edge formed from superhard material, thereby increasing its potential working life. In general, the thicker the softer protective layer adjacent the cutting edge, the greater the protection it provides against fracture.

Embodiments of the invention have the advantage that the impact and chipping resistance of the cutting edge is enhanced without substantially compromising with a reduced quality of cut edge of the workpiece. While wishing not to be bound by a particular theory, the use of a softer protective layer on the rake face of the cutting edge may have the benefit of improving the chipping resistance of the cutting edge, but may generally have the deleterious effect of resulting in the tearing or chipping of the cut edges of a workpiece, particularly a workpiece comprising wood or composite material. As a result of this the benefit of enhanced impact resistance may be offset in certain applications by a reduction in dimensional accuracy achieved in the workpiece, particularly by chipping of the workpiece. Even a slightly blunted cutting segment, blade or insert may, in certain cases, rip rather than cleanly cut a workpiece. In certain situations this may be intolerable, requiring subsequent fine-processing step to repair the damage caused by the relatively softer layer on the working surface of the superhard structure, which may be costly. Indeed, these tend to be precisely the applications in which superhard tools are used in order to ensure excellent dimensional accuracy, speed and reliability.

While wishing not to be bound by a particular theory, the advantage of embodiments of the invention may arise from the particular combination of the protective layer and a suitable range of wedge angles, which ensures sharp cutting in combination with enhanced chipping resistance and wear of the cutting edge. In general, the lower the wedge angle within the range of the invention, the thicker the softer protective coating may need to be. However, if the protective layer thickness is too great for a given wedge angle, the finish quality of the cut workpiece edge may be unsatisfactory. For a given wedge angle within the claimed range, a given superabrasive element material (e.g. a given type of PCD material), and for a protective layer having a given structure and composition, there may be an optimal range of thicknesses from which the thickness of the protective layer should be selected. If the wedge angle is less than about 20 degrees, then the superhard cutter element is prone to excessive fracture and the working life may be too low, even with the presence of a protective softer layer. If the wedge angle is greater than about 75 degrees, then it may not be possible to achieve sufficient tolerances on the dimensions and finish on the machined workpiece, even with the presence of a relatively thin protective softer layer.

EXAMPLES

Embodiments of the invention are described in more detail with reference to the examples below, which are not intended to limit the invention.

Example 1

A mass of unbonded diamond grains was placed on a surface of a cemented carbide substrate having cobalt as the binder phase, and this assembly was encapsulated in a molybdenum jacket to form a pre-compact assembly. The mass of diamond grains had an average size in the range from about 1 micron to about 10 micron and comprised a blend of two sources of diamond grains having respective mean sizes of about 2 microns and about 10 microns. The pre-compact assembly was loaded into a capsule for an ultra-high pressure furnace and subjected to a temperature of about 1,400 degrees centigrade and a pressure of about 5.5 GPa for sufficient time to form a sintered PCD compact. The PCD compact comprised PCD material in the form of a layer bonded to the cemented carbide substrate at an interface, and a layer comprising molybdenum carbide bonded to a surface of the PCD layer opposite the interface. It is believed that the molybdenum carbide layer arose from the reaction between the molybdenum jacket and carbon from the mass of diamond. The molybdenum carbide layer also contained some unreacted molybdenum. The polycrystalline diamond layer had a thickness of about 300 microns, measured from the interface with the substrate and the interface with the molybdenum carbide layer, and included a second phase containing cobalt.

The PCD compact was processed by grinding to remove the outer regions of the molybdenum-containing layer of molybdenum/molybdenum carbide, leaving a thin layer of coating on the PCD surface. The PCD compact was then further processed to form a cutter element comprising a tungsten carbide substrate, a PCD layer bonded to the substrate and a protective layer including a layer of molybdenum carbide, and having an overall thickness of 1.6 mm. The protective coating comprised a first sub-layer adjacent the interface between the PCD and the molybdenum carbide layer, this first sub-layer containing inter-bonded diamond, cobalt and molybdenum. The volume content of inter-bonded diamond within the first sub-layer was less than that of the underlying PCD and was therefore less hard and less wear resistant than the underlying PCD. The first sub-layer was about 25 microns in thickness and would normally have been ground off in the preparation of conventional PCD cutter elements. A second sub-layer disposed on the first sub-layer and comprising molybdenum carbide was substantially free of diamond grains and had a thickness of about 20 to 30 microns. The total thickness of the protective layer comprising the first sub-layer and the second sub-layer was therefore in the range from about 45 microns to about 55 microns.

A cutting edge on the PCD cutter element was prepared such that the side of the compact having the protective molybdenum-containing coating was to be the rake side, and the interface between the protective coating and the PCD structure was substantially parallel to the rake side, which was substantially planar. A wedge angle of 65 degrees was prepared, measured from this interface to a flank side. This combination of protective layer thickness and wedge angle was selected for an aggressive cutting operation for wood-containing workpieces.

Example 2

A PCD compact was prepared as in Example 1, except that the PCD layer had a thickness of about 150 microns and the second sub-layer comprising molybdenum carbide had a thickness of about 35 microns, the total thickness of the protective layer therefore being about 60 microns. The PCD compact was processed to form a cutter element having an overall thickness of 1.3 mm and a wedge angle of 60 degrees.

Example 3

A PCD compact was prepared as in Example 2, except that the second sub-layer comprising molybdenum carbide had a thickness of about 8 microns, the total thickness of the protective layer therefore being about 33 microns. The PCD compact was processed to form a cutter element having an overall thickness of 1.3 mm and a wedge angle of 60 degrees.

Example 4

A PCD compact was prepared as in Example 1, except that the PCD layer had a thickness of about 150 microns and the second sub-layer comprising molybdenum carbide had a thickness of about 80 microns, the total thickness of the protective layer therefore being about 105 microns. The PCD compact was processed to form a cutter element having an overall thickness of 1.3 mm a wedge angle of 45 degrees.

The PCD cutter element was tested by cutting 800 meters of laminated wood product. After the cutting test, the cut edges of the workpiece was examined and found to be extremely smooth and substantially free of chips or evidence of tearing. In addition, reduced wear of the cutting edge of the PCD cutting element was also evident.

Example 5

A PCD compact was prepared as in Example 1, except that the PCD layer had a thickness of about 350 microns and the second sub-layer comprising molybdenum carbide had a thickness of about 95 microns, the total thickness of the protective layer therefore being about 120 microns. The PCD compact was processed to form a cutter element having an overall thickness of 2.2 mm a wedge angle of 45 degrees.

The PCD cutter element was tested by cutting 1600 meters (could go for 50000 m) of laminated wood product. After the cutting test, the cut edges of the workpiece was examined and found to be extremely smooth and substantially free of chips or evidence of tearing. In addition, reduced wear of the cutting edge of the PCD cutting element was also evident.

The invention claimed is:

1. A superhard cutter element for machining a workpiece comprising wood, metal, ceramic material or composite material, the superhard cutter element comprising a superhard structure having a rake side and a flank side, the rake side and the flank side enclosing a wedge angle; and a protective layer bonded to the superhard structure at a rake interface on the rake side, the protective layer being softer than the material of the superhard structure; the wedge angle being at least 20 degrees and at most 75 degrees, a region of the protective layer proximate the cutting edge having a thickness in microns of at least $(13.3-0.11\omega)$ and at most the lower of (380-5.0ω) and (126.6-0.11ω), where the wedge angle ω is in the range from 35 degrees to 65 degrees.

2. A superhard cutter element as claimed in claim 1, a region of the protective layer proximate the cutting edge having a thickness in microns of at least (46.7-0.56ω and at most the lower of (380-5.0ω) and (126.6-0.11ω), where the wedge angle ω is in the range from 35 degrees to 65 degrees.

3. A superhard cutter element as claimed in claim 1, a region of the protective layer proximate the cutting edge having a thickness in microns of at least 20 microns and at most 200 microns, where the wedge angle ω is in the range from 35 degrees to 65 degrees.

4. A superhard cutter element as claimed in claim 1, a region of the protective layer proximate the cutting edge having a thickness in microns of greater than (86.6-1.33ω) and less than (380-5.0ω), where the wedge angle ω is in the range from 35 degrees to 65 degrees.

5. A superhard cutter element as claimed in any one of the preceding claims, the protective layer comprising a superhard material.

6. A superhard cutter element as claimed in claim 1, the protective layer comprising a first sub-layer adjacent the rake interface, comprising inter-bonded diamond grains, and a second sub-layer that is substantially free of superhard material.

7. A superhard cutter element as claimed in claim 6, the protective layer comprising a first sub-layer adjacent the rake interface, comprising inter-bonded diamond grains, and a second sub-layer that is substantially free of superhard material, the protective layer having a region proximate the cutting edge having a thickness of less than 50 micron.

8. A superhard cutter element as claimed in claim 1, the protective layer comprising a layer or sub-layer that is free of superhard material, the layer or sub-layer having thickness in the range from 1 micron to 80 microns.

9. A superhard cutter element as claimed in any one of the preceding claims, comprises polycrystalline diamond (PCD) material in which the diamond content is at least 80 volume % of the PCD material and the PCD material comprises inter-bonded diamond grains having a mean size of at least 0.5 microns at most 55 microns.

10. A superhard cutter element as claimed in claim 1, the mean Vickers hardness of the protective layer is at least 10% less than that of the superhard structure.

11. A superhard cutter element as claimed in claim 1, the protective layer comprising carbide of a metal selected from the group consisting of Mo, W, Nb, Ta, V, Ti, Cr, Zr, Hf and Si.

12. A superhard cutter element as claimed in claim 1, the superhard structure comprising PCD material in the form of a layer having a substantially uniform thickness, the mean value of which is at least 10 microns and at most 400 microns.

13. A segment, insert, blade or tool for machining or cutting a workpiece, comprising a superhard cutter element as claimed in claim 1.

14. A segment, insert, blade or tool as claimed in claim 13, for machining or cutting a body comprising material for laminate flooring.

15. A segment, insert, blade or tool as claimed in claim 13, for performing an interrupted or rough cutting operation on a workpiece comprising metal.

16. An insert for performing an interrupted or rough cutting operation on a workpiece comprising metal, the insert comprising a superhard cutter element as claimed in claim 3.

17. A method of using a segment, insert or tool comprising a superhard cutter element as claimed in claim 1, the method including engaging a workpiece comprising wood, composite or metal material, and removing material selectively from the workpiece.

\* \* \* \* \*